3,663,430
HYDROCARBON DEWAXING WITH A MORDENITE-TYPE ALUMINO-SILICATE

Herbert C. Morris, Wappingers Falls, N.Y., assignor to Texaco Inc., New York, N.Y.
Filed Dec. 22, 1967, Ser. No. 692,818
Int. Cl. B01j 11/40; C08g 13/02, 41/00; C01b 33/28
U.S. Cl. 208—111                                                 18 Claims

ABSTRACT OF THE DISCLOSURE

Hydrocarbon feedstocks containing wax-like materials are dewaxed in the presence of a mordenite-type crystalline alumino-silicate in hydrogen form having a silica to alumina mole ratio greater than about 10 to 1. A catalytic material, containing either a Group VIII or a Group VI-B metal, associated with the zeolite provides increased activity and longer catalyst life.

BACKGROUND OF THE INVENTION

This invention relates to a process for selective conversion of wax-like hydrocarbons to non-waxy products. In one of its more specific aspects, the present invention relates to a process for the treatment of a petroleum fraction to reduce its wax content. This invention is particularly related to the selective elimination of wax-like materials from fuel oil distillates and lubricating oil base stocks. This invention relates to a catalytic hydrocarbon processing technique employing a crystalline alumino-silicate of the mordenite type having a silica to alumina ratio substantially higher than that of hydrogen mordenite.

It has been proposed heretofore to contact petroleum fractions with molecular sieves, i.e., zeolites capable of preferentially adsorbing one hydrocarbon type, for example, straight chain normal paraffins or aromatic hydrocarbons, from a mixture containing several hydrocarbon types. In particular, molecular sieves having mean pore diameters of about 5 A. have been used for selectively removing straight chain paraffins from hydrocarbon mixtures. It has also been proposed to contact a petroleum distillate fraction in admixture with hydrogen with a molecular sieve having a pore diameter of about 5 A. under suitable operating conditions of temperature, pressure, and space velocity to cause cracking of the normal paraffin hydrocarbons to lower boiling straight chain hydrocarbons which can be removed from the feedstock by distillation.

It has also been proposed in copending application Ser. No. 558,569 (now U.S. Pat. 3,539,498), to contact a petroleum distillate fraction in admixture with hydrogen with a mordenite-type crystalline alumino-silicate in hydrogen form at suitable operating conditions of temperature, pressure, and space velocity to cause cracking of the waxy hydrocarbons to lower boiling hydrocarbons which can be removed from the feedstock by distillation. The hydrogen mordenite of this copending application is a decationized sodium mordenite wherein the sodium was removed by ion exchange with ammonium ions or by treatment with mineral acid. Both the hydrogen and sodium forms of these mordenites have a mole ratio of silica to alumina of about 10:1.

Although the process of the copending application describes a process wherein decationized mordenite permits the substantial reduction in pour point of hydrocarbon fractions and even the complete elimination of wax from some waxy distillates while the catalyst remains active for periods as long as several months without the necessity of regeneration, improvements in such a dewaxing process resulting in less severe operating conditions, lower pour points of the product, and/or longer operating runs are highly desirable.

SUMMARY OF THE INVENTION

I have found that significant improvements are realized in a process for dewaxing hydrocarbon distillate fractions in the presence of hydrogen and a decationized mordenite catalyst if the ratio of silica to alumina in the mordenite is substantially higher than that in a decationized mordenite whose preparation was limited to the removal of substantially all of the sodium ions. By a substantially higher silica to alumina ratio, I mean a mole ratio greater than about 10:1, preferably above about 20:1. In fact, I have found that, in general, the greater the silica to alumina ratio of the hydrogen mordenite the lower the pour point of the dewaxed product. However, although higher silica to alumina ratios than those previously used result in an improved dewaxing process, the preferred mole ratio is between about 20:1 and 60:1 and little significant improvement is achieved with a mordenite whose silica to alumina mole ratio is greater than about 100:1.

The sodium form of mordenite is not effective for wax conversion regardless of whether the temperature is within the range usually employed to effect cracking and regardless of catalyst additions. However, the hydrogen form of synthetic mordenite having a sodium content of less than 5 weight percent is exceptionally effective for selectively converting wax-like hydrocarbons to non-waxy hydrocarbons. Decationized mordenite, i.e., mordenite in the hydrogen form, may be produced by ion exchange of the sodium in the mordenite with ammonium ions followed by heating or calcining to drive off ammonia. However, an extremely effective method of producing the decationized mordenite is by acid treatment. In addition to decationizing the mordenite, acid treatment may also remove some of the aluminum from the zeolitic structure, thereby increasing the relative proportions of silica to alumina in the zeolite. In its sodium form, both natural and synthetic mordenite have a mole ratio of silica to alumina of about 10 to 1. Hydrogen mordenite also has a silica to alumina mole ratio of about 10 to 1 but acid treating the sodium mordenite to produce the decationized form may remove aluminum sufficiently to increase the silica to alumina ratio slightly above 10 to 1. In its decationized form mordenite is an effective catalyst for dewaxing waxy hydrocarbon distillates with or without the addition of catalytic metals. I have found, surprisingly, that further acid leaching of a mordenite zeolite in hydrogen form enhances both the catalytic activity and the operating life of the mordenite when employed in a hydrocarbon dewaxing process.

The acid leaching used to produce the mordenite catalysts employed in my process must be severe enough to substantially increase the silica to alumina mole ratio of the mordenite above about 10:1. However, the acid leaching must not be so severe as to destroy the crystalline structure of the mordenite. Further, little improvement has been observed in my dewaxing process where the silica to alumina ratio of the mordenite is greater than about 100:1. Consequently, as a practical limit the acid leaching should be severe enough to produce a mordenite having a silica to alumina ratio between 10:1 and 100:1, preferably between about 20:1 and 60:1.

Acid leaching may be suitably effected with mineral acids which will selectively remove aluminum without destroying the zeolitic crystalline structure, for example, hydrochloric or sulfuric acid. Boiling dilute hydrochloric acid is extremely effective in removing the aluminum. Following the leaching, the mordenite is water washed and calcined, with or without catalytic metal additions, in air at elevated temperatures up to about 1000° F. Because of this preparation method, the catalysts useful in my invention are referred to hereinafter, for convenience, as severely acid leached mordenites.

Although I have described an acid leaching technique for preparing the mordenite catalysts used in my process, this has been used for purposes of illustration and not of limitation as there is no intention of excluding any equivalents. Thus, hydrogen mordenites having silica to alumina mole ratios between about 10:1 and about 100:1 prepared by other methods may also be employed in my process.

Mordenite structures are characterized by parallel sorption channels of uniform cross-section. The sorption channels are parallel to the C-axis of the crystal and are elliptical in cross-section. The sorption channel dimensions of sodium mordenite, based on crystallographic studies, have been reported as having a minor diameter of 5.8 to 5.9 A., a major diameter of 7.0–7.1 A. and a free diameter of 6.6 A.; the hydrogen form of mordenite is believed to have somewhat larger pore openings with a minor diameter of not less than about 5.8 A. and a major diameter less than 8 A.

Although mordenite occurs in nature, synthetic mordenites are commercially available from the Norton Company under the trade name Zeolon. These mordenites have a chemical composition, on a unit cell basis, of

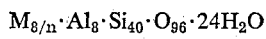

$$M_{8/n} \cdot Al_8 \cdot Si_{40} \cdot O_{96} \cdot 24H_2O$$

where M may be sodium, hydrogen or some other exchangeable cation, and $n$ is the valence of the cation. The high ratio of silica to alumina of 10:1 in the synthetic mordenite permits complete acid exchange to a stable hydrogen form and imparts excellent chemical and thermal stability. The effective working diameter of hydrogen mordenite prepared by acid treating synthetic sodium mordenite and marketed under the trade name Zeolon H appears to be in the range of 8 to 10 A. as indicated by an adsorption of aromatic hydrocarbons.

Natural zeolites such as faujasite, and synthetic zeolites such as Type A, Type X and Type Y, are capable of selectively adsorbing particular hydrocarbon types from mixtures of hydrocarbons and are hereinafter for the sake of simplicity referred to as molecular sieves. For example, when a mixture of n-heptane and benzene is contacted with a 5 A. molecular sieve at room temperature, n-heptane is selectively absorbed. The 5 A. sieves quantitatively remove the straight chain paraffins from cyclic or aromatic components of the mixture. Some of the molecular sieves will also selectively separate normal from branched chain hydrocarbons. It is usually necessary to employ a two step cyclic process consisting of an adsorption step and a desorbing step when separating normal from non-normal hydrocarbons with molecular sieves. When the adsorptive capacity of the sieve is exhausted it must be reactivated by a desorption step before it can be used for adsorption again. This desorption step is usually carried out by displacing the adsorbed materials with a dissimilar fluid. During this cyclic process a difficulty is encountered in that a carbonaceous deposit gradually builds up on the surface of the sieve requiring periodic regeneration of the sieve. Heating the molecular sieve to a high temperature and burning off the carbonaceous deposits with an oxygen-containing gas is one of the regeneration techniques commonly employed. With a 5 A. molecular sieve, some reduction in pour point of waxy feedstocks may be obtained in a cyclic adsorption-desorption process wherein the waxy feedstock is percolated through or over the molecular sieves. No such reduction in pour point is exhibited when a similar waxy stock is percolated over hydrogen mordenite at temperatures below the temperatures required to crack the wax, i.e., below 200° F. In order to achieve any significant dewaxing or pour point reduction of the feedstock with mordenite, the temperature must be raised above about 450° F. On the other hand, a 200° F. temperature would be satisfactory for obtaining some measure of dewaxing with the 5 A. sieve. Further, the sodium form of mordenite is ineffective for wax conversion regardless of whether the operating temperature is within the cracking region and regardless of catalytic additions to the mordenite.

It would appear that the effectiveness of a mordenite-type zeolite for cracking of waxy paraffins is not solely dependent upon the size of the pore opening. Synthetic mordenites have pore sizes as determined by crystallographic measurements, somewhere between those of a Type A molecular sieve on one hand, which are capable of admitting no hydrocarbons larger than normal paraffins into the unit cell, and the Types X and Y synthetic zeolites and faujasite, on the other hand, which admit larger molecules. Attempts to use modified Types A, X, and Y molecular sieves having pore diameters larger than conventional Type A and smaller than conventional Types X and Y as substitutes for mordenite in my process have proven unsuccessful.

Structurally mordenite is significantly distinguishable from other zeolites. Mordenite has a chain type zeolite structure in which a number of chains are linked together into a structural pattern with parallel sorption channels similar to a bundle of parallel tubes. In contrast Type A, Type X and Type Y synthetic zeolites and faujasite have three dimensional crystalline cage structures having 4 to 6 windows or pore openings per unit cell through which access may be had to the inner cavity or unit cell of the zeolitic molecular sieve. Although these three dimensional molecular sieves are important catalyst in a number of hydrocarbon reactions, I have found that they are not as effective for selective conversion of paraffin wax or other high melting point hydrocarbons to lower molecular weight products as compared with the severely acid leached mordenite structures used in my process.

BRIEF DESCRIPTION OF DRAWINGS

The present invention will be more readily understood by reference to the accompanying drawings in which.

DESCRIPTION OF THE PREFERRED EMBODIMENTS

Figure 1:
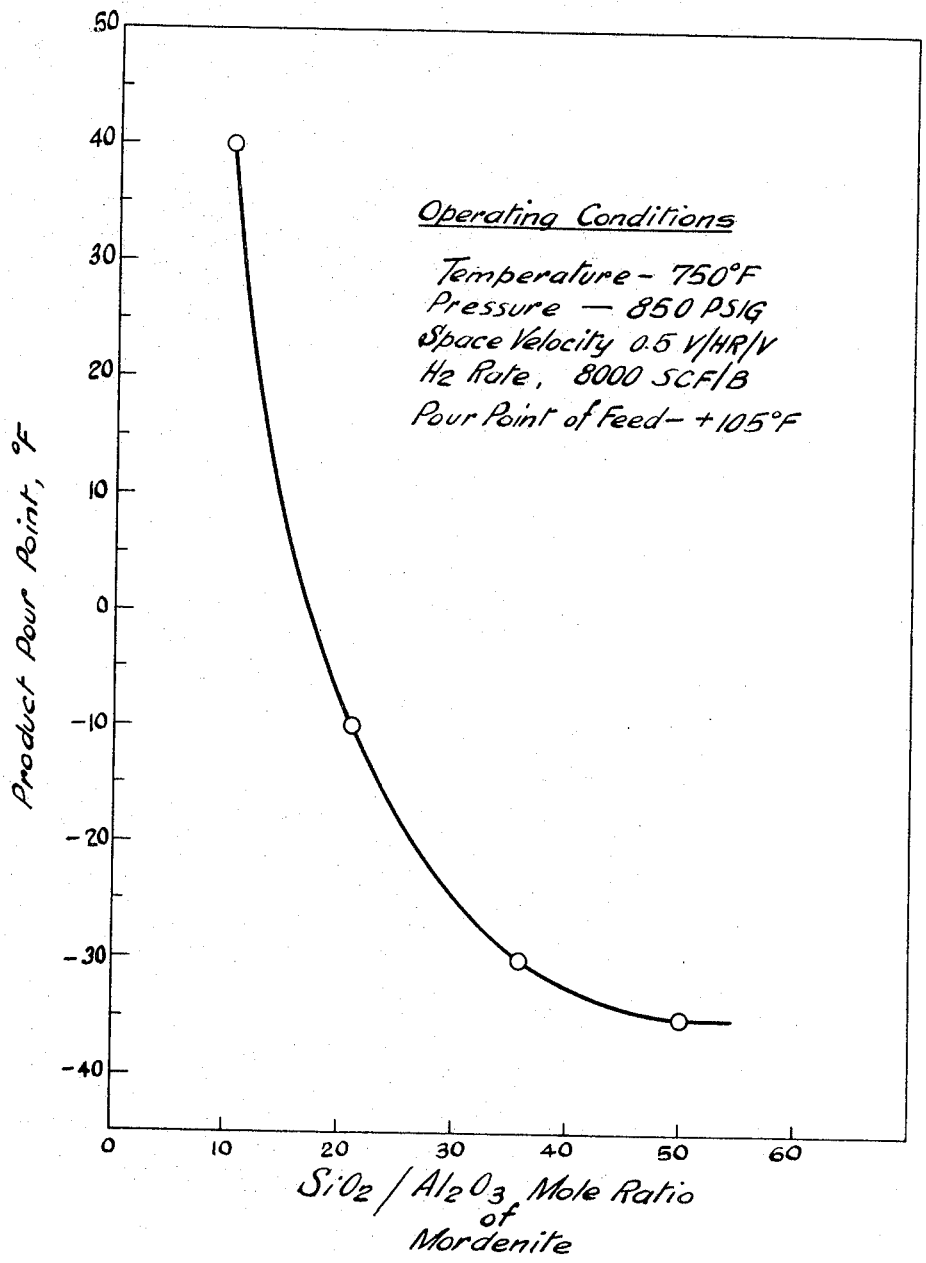
FIG. 1 is a graphical representation of data illustrating the effect of the silica to alumina ratio of a hydrogen mordenite catalyst on the pour point of the product produced when a waxy feedstock is dewaxed in the presence of the mordenite.

In accordance with the present invention, a petroleum fraction containing wax-line hydrocarbons is contacted with mordenite in hydrogen form wherein the silica to alumina mole ratio is greater than about 10 to 1 at a temperature effective for conversion of at least part of the higher melting point, wax-like hydrocarbons to non-waxy products. Usually, the wax-like hydrocarbons are in admixture with non-waxy hydrocarbons and usually mixed also with hydrocarbons of other types, for example, naphthenes, aromatics, olefins or asphaltic materials. Since little, if any, improvement has been observed in utilizing a mordenite having an exceptionally high silica to alumina ratio, the practical upper limit for the mordenites useful in the process of my invention are those having silica to alumina mole ratios of about 100 to 1.

In a preferred method of operation, hydrocarbon feedstocks containing wax-like hydrocarbons are passed, in the presence of hydrogen, into contact with a zeolite of the mordenite type in hydrogen form and having a silica to alumina mole ratio greater than about 10:1 and less than about 100:1, preferably between about 20:1 and 60:1, under relatively mild hydroconversion reaction conditions. A catalyst material, suitably a Group VI-B or a Group VIII metal, particularly a platinum group metal, is preferably associated with the mordenite. The activity of the catalyst is enhanced and its useful life extended by the addition of the metal catalyst, either by impregnation or by ion exchange techniques. The process of my invention is referred to for convenience as a catalytic dewaxing process.

The improvements that I have effected in this process by the use of a severely acid leached mordenite are realized when removing wax from hydrocarbon feedstocks. The terms "wax," "waxy" and "wax-like" as used herein have their usual meanings in the art, i.e., those high melting point hydrocarbons which can be removed from hydrocarbons mixtures by solvent dewaxing procedures involving dilution and chilling of the mixture followed by removal of solidified hydrocarbons from the solution. The wax content of hydrocarbon mixtures can be effectively reduced by employing the improvements of my invention.

Among the hydrocarbon feedstocks which may usefully employ this process are those generally known as lubricating oil distillates, middle distillates and fuel oil distillates. Thus the improvements of my process may be utilized to process distillates to produce such products as low pour point lubricating oils, low pour point fuel oils, low point diesel fuel oils and low haze refrigerator oils. My process is also useful for dewaxing a low quality naphthene oil or a lubricating oil fraction from a semi-naphthenic (mixed paraffinic and naphthenic) base crude oil to produce a naphthene oil with a low pour point. Commerically these low pour point oils have been produced by urea dewaxing.

Hydrogen, though not necessary for the selective catalytic activity of severely acid leached mordenite for the waxy hydrocarbons, is desirable in that hydrogen extends the life of the catalyst. Hydrogen apparently saturates the free radicals which form within the zeolitic structure when molecules are cracked thereby preventing the formation of polymeric material which would foul the pore openings. It is also desirable to precondition the catalyst by heating to a temperature in the range of 450 to 1000° F. in hydrogen.

Catalytic additions are also generally desirable, particularly when treating charge stocks containing relatively large percentages of high melting point paraffins or petroleum waxes. Group VIII metals, particularly iron, cobalt, nickel, palladium, platinum and rhodium have been found especially useful catalytic additions to hydrogen mordenite having silica to alumina mole ratios above 10:1. In addition to the Group VIII metals which are desirable components of the catalyst, it may be desirable to include metals of Group VI-B of the Periodic Table. For example, molybdenum and tungsten and in particular, combinations of cobalt and molybdenum, nickel and molybdenum, and nickel and tungsten are desirable in the catalyst. The catalytic metal may be incorporated in or on the zeolite base either by ion exchange or by impregnation techniques well known in the art of catalyst manufacture. Hydrogen mordenite having a silica to alumina mole ratio greater than 10:1 and containing from 0.1 to 5 percent palladium or platinum by weight, preferably 0.5 to 2.5 percent of either palladium or platinum are effective catalysts for use in the process of my invention. Synthetic mordenite in hydrogen forming having a silica to alumina mole ratio between about 10 to 1 and 100 to 1, preferably between about 20 to 1 and 60 to 1, and having 2 to 2.5 percent by weight palladium incorporated thereon by impregnation has proven to be a very active and rugged catalyst and is particularly preferred. This particular catalyst is highly resistant to high temperatures permitting regeneration of a catalyst by either oxidation techiniques or high temperature hydrogen treatment. In some instances metal additions of up to about 20 percent by weight of the mordenite may be desirable.

Regeneration of the catalyst by oxidation involves controlled burning of the contaminants from the surface of the catalyst structure with air, or a mixture of inert gases with air or oxygen. Regeneration may also be effected by treatment of the catalyst with hydrogen at temperatures generally above the usual conversion reaction temperature. We have found that palladium on severely acid leached mordenite catalyst structures will withstand high temperatures, e.g. temperatures above 1200° F. and possibly as high as 1500° F., without evidence of damage to the catalyst or deleterious effect on the activity of the catalyst for selective dewaxing.

In general, preferred operating conditions for continuous catalytic dewaxing as practiced by my invention, i.e., selective conversion of high melting point hydrocarbons to lower molecular weight lower boiling hydrocarbons in the presence of a hydrogen mordenite having a silica to alumina mole ratio greater than 10:1 and less than 100:1, preferably between about 20:1 and 60:1 are: hydrogen feed rates in the range of 0 to 20,000 s.c.f./bbl., preferably 500–10,000 s.c.f./bbl,; space velocities in the range of about 0.1 to 10 liquid volumes per hour per volume of catalyst, preferably 0.25 to 5.0 LHSV; temperatures in the range of about 450 to 950° F.fi preferably 500 to 850° F., and pressures within the range of atmospheric to 5000 p.s.i.g., preferably in the range of 200 to 1500 p.s.i.g.

The catalyst may be in the form of granules, e.g., 10 to 25 mesh Tyler Standard Screen Scale, and preferably is in the form of pellets or extrusions having a diameter of about ⅛ inch. The reaction is suitably carried out over a fixed bed of catalyst with the hydrogen and feedstock passing downwardly through the catalyst bed. Unreacted hydrogen may be separated from the effluent stream from the catalyst bed and recycled to the process.

Hydrogen consumption usually depends primarily upon the severity of the operating conditions and the content of high melting point paraffin hydrocarbons in the range stock. For example, in the catalytic treatment of refrigerator oils for haze temperature reduction hydrogen consumption is less than 100 standard cubic feet per barrel, whereas dewaxing of conventional motor oil base stocks normally results in consumption of 150 to 600 standard cubic feet per barrel.

Operating temperature and catalyst activity are correlated with space velocity to give reasonably rapid processing of the feedstock at catalyst deactivation rates which insure maximum on-stream time of the catalyst between periods of regeneration. On-stream time between periods of regeneration usually range from 2 months to 2 years.

As the catalyst ages, its activity for the desired reaction tends to slowly diminish. The catalyst may be maintained at or periodically brought back to approximately its initial level of activity by increasing the operating temperature as the catalyst ages. In general, I have found that an increase in temperature of about 12° F. effects about 1 percent increase in the amount of wax cracked that is converted to lower boiling products.

The following examples illustrate the practice and advantages of the invention.

Example 1

This example illustrates the increase in catalytic activity of hydrogen mordenite with increasing silica to alumina ratio.

A series of catalytic dewaxing runs were made with hydrogen mordenite catalysts having varying silica to alumina ratios. None of the mordenite catalysts contained added catalytic metals. The charge stock was a furfural refined waxy distillate having a pour point of 105° F. and a viscosity of approximately 50 SSU/210° F. The operating conditions in all instances were a temperature of 750° F., a pressure of 850 p.s.i.g., a space velocity of 0.5 v./hr./v. and a hydrogen rate of 8,000 s.c.f./b. The pour point of the dewaxed product was measured to indicate the activity of the particular catalyst under study. Four runs were made utilizing mordenite in hydrogen form having silica to alumina mole ratios of 10 to 1, 21 to 1, 36 to 1 and 50 to 1, respectively. The mordenite having the 10 to 1 silica to alumina ratio was a decationized mordenite in hydrogen form sold by Norton Co. under the trade name as Zeolon H and which is the subject of the copending application referred to above.

The pour point of the dewaxed product was measured at the end of 25 hours in each of the four runs. The results are presented in FIG. 1 which shows the significant decrease in pour point with increasing silica to alumina ratio of the mordenite. It is particularly striking that acid leaching the mordenite beyond the point of substantial removal of the sodium produces a catalyst with substantially increased activity. It is also significant that the principal benefits of increasing the silica to alumina mole ratio are achieved in the range of 10:1 to 60:1. Little significant benefits are achieved in increasing the mole ratio of silica to alumina above about 100:1.

Example 2

This example shows the effect of increased silica to alumina ratio not only on catalytic activity but also on catalyst life.

Two runs were made in this test by dewaxing a furfural refined wavy distillate having a pour point of 105° F. and a viscosity of about 50 SSU/210° F. The operating conditions used in both runs were: a temperature of 650° F., a pressure of 850 p.s.i.g., a hydrogen rate of 8,000 s.c.f./b. and a space velocity of 0.5 v./hr./v. The decationized mordenite in both runs contained added catalytic metal, 2 percent paladium. In the first run a decationized mordenite having a 10 to 1 silica to alumina mole ratio was employed while that in the second run had a silica to alumina mole ratio of 50 to 1.

Figure 2:
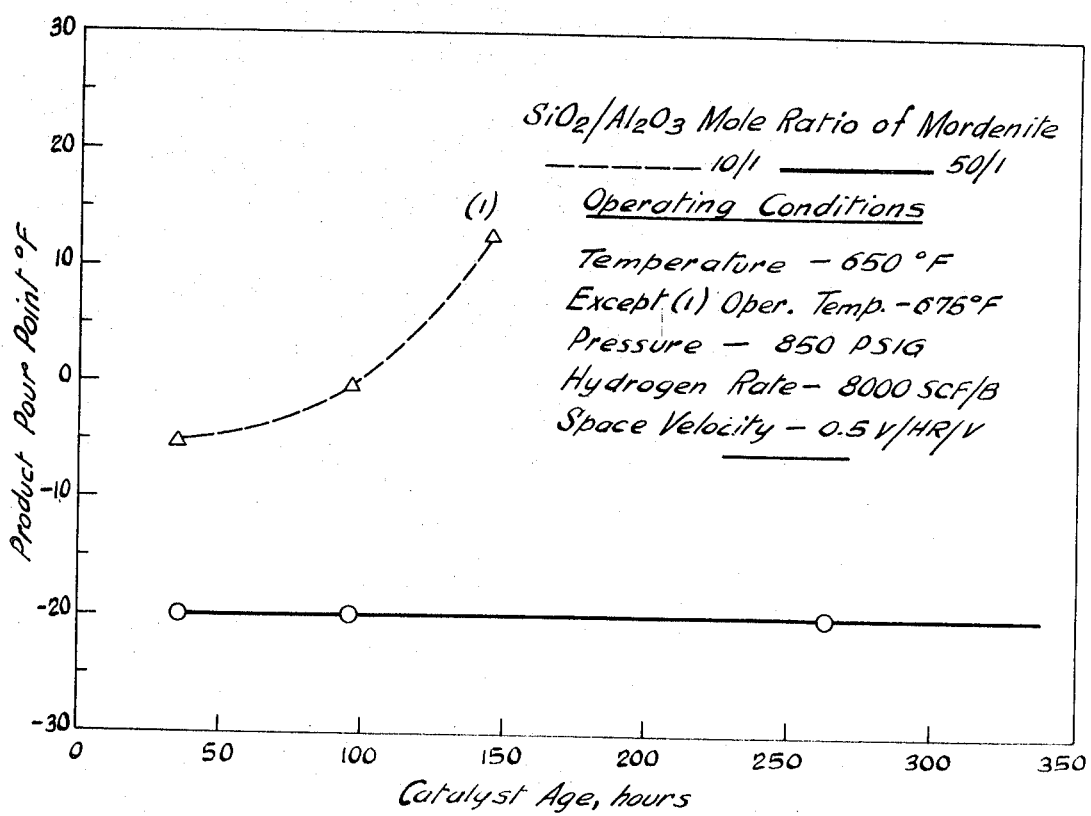
FIG. 2 is a graphical representation of data illustrating the effect of the silica to alumina ratio of a hydrogen mordenite on the catalytic activity and the life of the catalyst.

The results of these two runs are shown in FIG. 2.

It is seen that catalytic dewaxing with the catalyst having the 10 to 1 silica to alumina ratio produced a higher pour point than the catalyst with the higher silica to alumina ratio after approximately 50 hours of operation. Thereafter, the pour point of the product produced by the first catalyst increased with operating time to the extent that after approximaely 140 hours the operating temperature had to be increased to 675° F. to produce a dewaxed product with a pour point of 13° F. Conversely, the run utilizing the decationized mordenite having the 50 to 1 silica alumina ratio not only produced a lower pour point of —20° F. After a short operating time but continued to produce this low pour point product far beyond the point where the operating temperature of the first run was increased. In fact, the product pour point of —20° F. was still being maintained after the run had proceeded in excess of 250 hours.

Example 3

The effect of dewaxing temperatures on decationized mordenite having varying silica to alumina ratios was demonstrated with several distillates.

A paraffin base distillate having a pour point of 50° F. and a viscosity of approximately 70 SSU at 100° F. was catalytically dewaxed in parallel runs with decationized mordenite having 10 to 1 and 37 to 1 silica to alumina mole ratios, respectively. Neither mordenite catalyst contained any added catalytic metals. The results are presented in Table I.

TABLE I

| Feed: | Paraffin-base distillate | |
|---|---|---|
| Pour point, ° F | 50 | |
| Viscosity, SSU/100 | 70 | |
| Silica/alumina mole ratio of decationized mordenite: | 10:1 | 37:1 |
| LHSV, v./hr./v | 0.46 | 0.49 |
| Temp., ° F | 775 | 775 |
| Pour point of product, ° F | 15 | —15 |
| Hours on catalyst | 81 | 151 |
| LHSV, v./hr./v | | 0.45 |
| Temp., ° F | (¹) | 800 |
| Pour point of product, ° F | | 20 |
| Hours on catalyst | | 203 |

¹ No catalytic activity after 119 hours.

It will be noted that the catalyst with the higher silica to alumina ratio produced about at 30° F. lower pour point at the same reactor temperature. Further, this catalyst was still active for dewaxing purposes after 203 hours on stream whereas the conventional catalyst was inactive after 119 hours.

In another test a wax distillate having a pour point of 100° F. and a viscosity of approximately 50 SSU at 210° F. was catalytically dewaxed. The results of two parallel runs with decationized mordenite having varying silica to alumina ratios and impregnated with 2 percent of palladium are shown in Table II below.

TABLE II

| Feed: | Wax distillate | |
|---|---|---|
| Pour point, ° F | 100 | |
| Viscosity, SSU/210 | 50 | |
| Silica/alumina mole ratio of decationized mordenite (impregnated with 2% Pd): | 10:1 | 37:1 |
| LHSV, v./hr./v | 0.25 | 0.50 |
| Temp., ° F | 575 | 575 |
| Pour point of product, ° F | 25 | 5 |
| Hours on catalyst | 113 | 110 |
| LHSV, v./hr./v | 0.25 | 0.5 |
| Temp., ° F | 600 | 550 |
| Pour point of product, ° F | 15 | 15 |
| Hours on catalyst | 125 | 206 |

These results show that the modenite having the higher silica to alumina ratio permits a higher throughput at the same dewaxing temperature for a greater degree of dewaxing or a substantially lower reaction temperature for the same degree of dewaxing as measured by pour point of the product.

Example 4

This example demonstrates the utility of my process in lowering the pour point of a middle distillate fuel.

A 32.2° API middle distillate having a pour point of 40° F. and a cloud point of 50° F. was catalytically dewaxed with a decationized mordenite having a silica to alumina mole ratio of 10:1 and a catalyst metal addition of 2 weight percent of palladium. The operating conditions include a reactor pressure of 850 p.s.i.g., a liquid hourly space velocity of 2, an average reactor temperature of 750° F. and a hydrogen rate of 7000 s.c.f./bbl. The feedstock had a 5/95 ASTM distillation of 592 to 654.

The dewaxed product had a gravity of 30.8° API, a pour point of 0° F. and a cloud point of +2° F. The boiling range was essentially the same, the 5/95 ASTM distillation of 596 to 660.

The process of my invention permits the same dewaxed product to be produced for the same distillate at a 75° F. lower (675° F.) reactor temperature, the other processing conditions remaining the same.

Examples 5–7

These examples illustrate the production of low pour naphthene-type lube stocks by the process of our invention. In example 5, an acid treated, paraffin base, atmosperic gas oil was the feed. The feedstocks in Examples 6 and 7 were low quality naphthene distillates. The catalyst in all examples was a hydrogen mordenite having a silica to alumina mole ratio of 53 to 1 impregnated with 2 weight percent palladium. The feed and product tests and the operating conditions are shown in Table III, below.

TABLE III

| Example number | 5 | 6 | 7 |
|---|---|---|---|
| Catalyst age, hours | 437 | 533 | 655 |
| Feedstock: | | | |
| Viscosity, SSU/100° F | 49.8 | 105 | 53 |
| Pour point, ° F | +35 | —5 | —25 |
| Operating conditions: | | | |
| Pressure, p.s.i.g | 300 | 320 | 320 |
| Temperature, ° F | 725 | 650 | 675 |
| Space velocity, v./hr./v | 1.0 | 1.0 | 2.0 |
| H₂ rate, s.c.f./bbl | 2,000 | 1,990 | 2,300 |
| Product: | | | |
| Viscosity, SSU/100° F | 55.4 | 128 | 57.7 |
| Pour point, ° F | —75 | —55 | —65 |

The terms and expressions used herein are used as terms of description and not of limitation as there is no intention, in the use of such terms and expressions, of excluding any equivalents as it is recognized at various modifications and departures in the practice of the invention as shown above can be made within the scope of the invention claimed.

I claim:

1. A process for selective conversion of wax-like hydrocarbons which comprises contacting said hydrocarbons at a temperature of at least 450° F. with a crystalline alumino-silicate zeolite in hydrogen form having uniform pore openings with a minor pore diameter as determined by crystallography of not less than 5.8 and a major pore diameter less than 8 A., said zeolite containing substantially no sodium and having a silica to alumina mole ratio between about 20:1 and about 60:1.

2. A process according to claim 1 wherein said contacting is carried out in the presence of hydrogen.

3. A process according to claim 1 wherein said wax-like hydrocarbons are contained in a lubricating oil base stock and said conversion effects a reduction in the pour point of the said stock.

4. A process according to claim 1 wherein said wax-like hydrocarbons are contained in a middle distillate boiling in the range of about 400–700° F. and said conversion effects a reduction in the pour point of said distillate.

5. A process according to claim 1 wherein said wax-like hydrocarbons are contained in a naphthene-containing distillate fraction and said conversion effects a reduction in the pour point of said fraction.

6. A process according to claim 1 wherein said alumino-silicate zeolite contains a Group VIII metal in intimate association therewith in an amount within the range of 0.1 to 5 wt. percent.

7. A process according to claim 6 wherein said Group VIII metal is a noble metal selected from the group consisting of palladium, platinum and rhodium.

8. A process according to claim 6 wherein said Group VIII metal is nickel.

9. A process according to claim 1 wherein said alumino-silicate zeolite contains one or more metals of Group VI–B.

10. A process for selective conversion of wax-like hydrocarbons which comprises contacting said hydrocarbons at a temperature in the range of 450–950° F. with a mordenite type crystalline alumino-silicate zeolite in hydrogen form and having a silica to alumina mole ratio between about 20:1 and about 60:1.

11. A process for dewaxing a wax-containing hydrocarbon oil which comprises contacting said oil at a temperature of at least 450° F. with a crystalline alumino-silicate zeolite in hydrogen form having parallel sorption channels with a silica to alumina mole ratio between about 20:1 and about 60:1.

12. A process according to claim 11 wherein said alumino-silicate zeolite is a severely acid leached mordenite.

13. A process according to claim 12 wherein said mordenite prior to acid leaching is a synthetic sodium mordenite.

14. In a process for dewaxing a wax-containing hydrocarbon oil wherein the oil is contacted with a mordenite-type crystalline alumino-silicate zeolite in hydrogen form at a temperature in the range of 450–950° F. in the presence of hydrogen in the range of 500–10,000 standard cubic feet per barrel of oil at a space velocity in the range of 0.25 to 5 liquid volumes of said oil per volume of catalyst per hour and at a pressure in the range of 200 to 1500 p.s.i.g., the improvement which comprises contacting the oil with a mordenite-type crystalline alumino-silicate zeolite in hydrogen form having a silica to alumina mole ratio between about 20:1 and about 60:1.

15. A process according to claim 14 wherein said alumino-silicate zeolite contains a Group VIII metal in intimate association therewith in an amount within the range of 0.1 to 5 wt. percent.

16. A process according to claim 15 wherein said Group VIII metal is a noble metal selected from the group consisting of palladium, platinum and rhodium.

17. A process for dewaxing a wax-containing hydrocarbon oil which comprises contacting said oil with a mordenite-type crystalline alumino-silicate zeolite in hydrogen form having a silica to alumina ratio between about 20:1 and about 60:1 at a temperature in the range of 450–950° F. in the presence of hydrogen in the range of 500–10,000 standard cubic feet per barrel of oil at a space velocity in the range of 0.25 to 5 liquid volumes of said oil per volume of catalyst per hour and at a pressure in the range of 200 to 1500 p.s.i.g.

18. A process according to claim 17 wherein said alumino-silicate zeolite contains a material selected from the group consisting of Group VIII metals, Group VI–B metals and mixtures thereof in the intimate association with said zeolite in an amount within the range of 0.1 to 20 wt. percent.

References Cited
UNITED STATES PATENTS

| | | | |
|---|---|---|---|
| 3,268,436 | 8/1966 | Arey et al. | 208—111 |
| 3,367,884 | 2/1968 | Reid | 208—120 |
| 3,395,096 | 7/1968 | Gladrow et al. | 208—111 |
| 3,374,182 | 3/1968 | Young | 208—111 |
| 3,516,925 | 6/1970 | Lawrence et al. | 208—111 |
| 3,442,794 | 5/1969 | Van Helden et al. | 208—111 |
| 3,442,795 | 5/1969 | Kerr et al. | 208—120 |
| 3,480,539 | 11/1969 | Voorhies et al. | 208—111 |
| 3,539,498 | 11/1970 | Morris et al. | 208—111 |

DELBERT E. GANTZ, Primary Examiner

G. E. SCHMITKONS, Assistant Examiner

U.S. Cl. X.R.

23—112; 208—18, 59, 120; 252—455 Z; 260—666 SA, 674 R, 683.5